US012277852B2

(12) United States Patent
Bercovici et al.

(10) Patent No.: US 12,277,852 B2
(45) Date of Patent: Apr. 15, 2025

(54) IoT SECURITY DEVICE

(71) Applicant: Essence Security International (E.S.I.) Ltd., Herzlia Pituach (IL)

(72) Inventors: Mihael Bercovici, Shoham (IL); Ran Rosenblum, Petach Tikva (IL); Ohad Amir, Herzlia (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 0 days.

(21) Appl. No.: 18/563,840

(22) PCT Filed: May 24, 2022

(86) PCT No.: PCT/IL2022/050542
§ 371 (c)(1),
(2) Date: Nov. 22, 2023

(87) PCT Pub. No.: WO2022/249171
PCT Pub. Date: Dec. 1, 2022

(65) Prior Publication Data
US 2024/0273995 A1    Aug. 15, 2024

(30) Foreign Application Priority Data
May 24, 2021    (GB) .................................... 2107379

(51) Int. Cl.
*G08B 25/00*    (2006.01)
*G08B 25/08*    (2006.01)
*H04W 52/02*    (2009.01)

(52) U.S. Cl.
CPC ........... *G08B 25/008* (2013.01); *G08B 25/08* (2013.01); *H04W 52/0225* (2013.01)

(58) Field of Classification Search
CPC .... G08B 25/008; G08B 25/08; G08B 29/181; H04W 52/0225; Y02D 30/70; H04M 11/04
See application file for complete search history.

(56) References Cited

U.S. PATENT DOCUMENTS

2014/0294180 A1    10/2014    Link, II
2016/0098916 A1    4/2016    Bieser
(Continued)

FOREIGN PATENT DOCUMENTS

CN    110139009 A    8/2019
WO    2022249171 A1    12/2022

OTHER PUBLICATIONS

Foreign Communication from a Related Counterpart Application, Combined Search and Examination Report dated Mar. 8, 2022, UK Application No. GB2107379.6 filed on May 24, 2021.
(Continued)

*Primary Examiner* — Omeed Alizada
(74) *Attorney, Agent, or Firm* — Conley Rose, P.C.

(57) ABSTRACT

A security response device is capable of being held in a communications mode or a power saving mode. In the communications mode, it is capable of sending a security threat message to a base station and of receiving a response. In the power saving mode, it is capable of detecting security threats but not performing communication functions. Detection of a security threat causes the device to exit the power saving mode and enter the communications mode.

20 Claims, 12 Drawing Sheets

(56) References Cited

U.S. PATENT DOCUMENTS

2016/0189515 A1    6/2016  Shapiro et al.
2020/0068354 A1*  2/2020  Stapleford ............ H04W 4/029
2020/0396574 A1*  12/2020  Stapleford ............ A01M 23/16
2021/0043064 A1    2/2021  Wright et al.

OTHER PUBLICATIONS

Foreign Communication from a Related Counterpart Application, International Search Report and Written Opinion dated Nov. 15, 2022, International Application No. PCT/IL2022/050542 filed on May 24, 2022.

Foreign Communication from a Related Counterpart Application, International Preliminary Report on Patentability dated Dec. 7, 2023, International Application No. PCT/IL2022/050542 filed on May 24, 2022.

\* cited by examiner

IoT SECURITY DEVICE

RELATED APPLICATION/S

This application claims the benefit of priority of Great Britain Patent Application No. 2107379.6 filed on 24 May 2021, the contents of which are incorporated herein by reference in their entirety.

FIELD

The present disclosure is in the field of security devices enabled to connect to a cellular network.

BACKGROUND

Systems for use in providing a security function in a premises or other area of interest, often comprise a plurality of discrete security devices and a control hub, which is locally installed. In background examples, a security system can comprise a plurality of monitoring devices each connected to a control hub by means of electrical connections. This can involve significant effort and disruption for installation.

Security devices may have functionality to take one or more actions in response to an identified threat. Such "security response actions" may include verification actions, such as capturing a photo or video, or deterrent actions, such as outputting one or more deterrents. The deterrent action may comprise an audible or visible emission (e.g. a siren or flashing light). Additionally or alternatively the deterrent may comprise the outputting of a deterrent that is neither visual or nor audio, such as a visible-light obscuring matter e.g. smoke, water vapour or other light-obscuring substance, or any other physiologically and/or psychologically influencing deterrent. Such other deterrents may provide a stronger level of deterrence than visual and/or audio deterrents. In the case of outputting of light obscuring substance, for example, the substance hinders visibility in the environment, deterring an intruder from remaining or advancing in the environment.

In order to avoid substantial disruption and cost of installation, security devices can be battery-powered and capable of establishing a local wireless connection with a locally installed control hub. However, the power consumption constraint associated with battery power can limit the capability of a security device, particularly if it is required to maintain a local wireless connection to the control hub.

DESCRIPTION OF EMBODIMENTS

Figure 1:
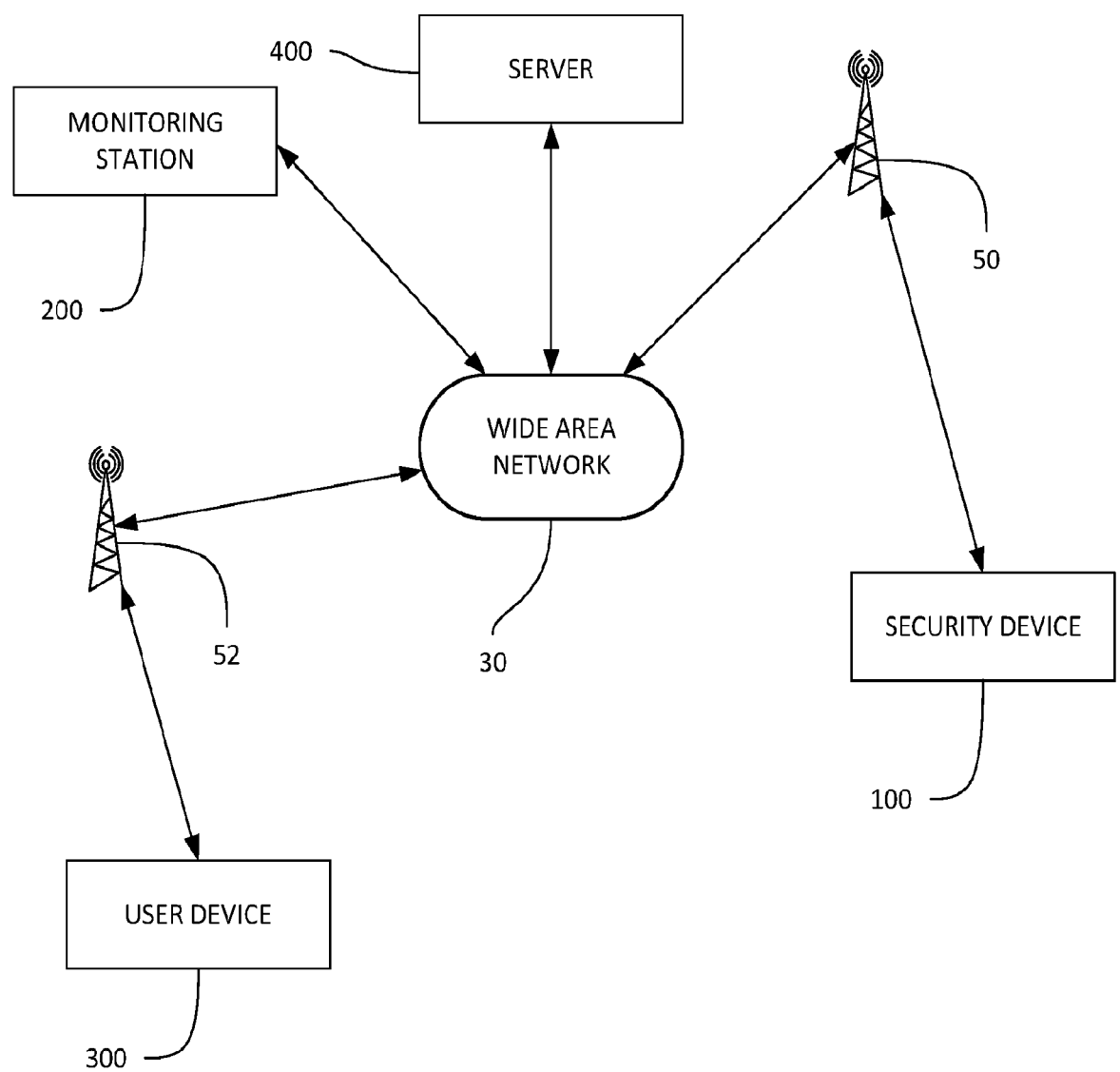
FIG. 1 illustrates a security network in accordance with an embodiment.

In general terms, embodiments of a security response device are disclosed, which are able to establish a cellular communications channel with a server. The cellular communications herein may be LTE compliant, for example in accordance with CAT MI or CAT NB2 parts of the LTE protocol, in some embodiments. This obviates the need for a locally installed control hub. In embodiments, the security response device comprises a cellular modem for establishing such connection, and the device is operable in a power saving mode in which the communications capabilities of the cellular modem are inhibited. In this mode, the device cannot be able to receive cellular communications.

In embodiments, the security response device comprises a security threat sensor for detecting a security threat. When a security threat is detected, the device initiates the emission of a security threat signal. This is achieved by exiting the power saving mode, and enabling use of the cellular modem. In embodiments, the device is battery powered, and the use of the cellular modem implicates power consumption. So, the power saving mode enables avoidance of unnecessary power consumption which would otherwise arise from maintaining the cellular modem in a receptive mode in which it is listening for cellular signals. Instead, by limiting such listening to periods when such communications are deemed necessary, such as when a threat is detected and an instruction on how to respond may need to be received, the power consumption of the device can be managed.

While there is a desire to maintain the security response device in the power saving mode as much as possible to conserve local source of electrical energy, it may also be desirable to maintain the established connection to the cellular network. This may be achieved by the security response device occasionally (although potentially even on the scale of months) waking temporarily from its power saving mode to send a signal to the cellular network, and then returning to power saving mode. More commonly, there is occasional temporary waking to transmit a maintenance signal that may be used either to maintain a connection to a service (e.g. a keep alive signal) and/or to tell a server that the device is still functioning healthily (e.g. a signal for supervision purposes). Optionally the signal may comprise a tracking area update. In some embodiments, this is performed with a periodicity of that may for example be between 1 and 4 hours, e.g. every 2 hours.

In some embodiments, when in the power saving mode, the security device inhibits all functions of the cellular modem. It may be convenient or desirable to temporarily exit the power saving mode, even when there is no security activity, to enable transient communication of information to the cellular network and/or a server, and enabling receipt of data in response thereto. For example, the cellular connection may be maintained by transmitting tracking area update.

In an embodiment, the device is operable to wake from the power saving mode to enter a communications mode comprising a receptive mode after emission of a security threat signal, for a predetermined time period. In some embodiments, the receptive mode is a "discontinuous receive" (often referred to as DRX) mode in which the device enables the cellular modem for reception capability intermittently, e.g. listening periods spaced by non-listening (optionally sleep) periods, with the listening periods repeating with a periodicity in the range of 0.64 to 5.12 seconds, within the predetermined time period, so as to avoid excessive power consumption. For example, while in DRX mode, the device may listen for approximately 40 ms every 2.56 seconds. The duration of the predetermined time period is the same as the duration set in LTE by the T3324 Active Timer (also referred to herein simply as T3324).

The security device may have an arming state. The arming state defines whether the device is either in an "armed" state, in which the security device will carry out a threat response action (also referred to herein as a security response action or a security threat response response), or an "unarmed" state in which it will not. The arming state of the security device may be specific to that security device or may be of the security system as a whole, or to a part thereof, to also be applicable to other devices in the security system.

In some embodiments, knowledge of the current arming state of the device is maintained only away from the premises, e.g. at the server. In other words, configuring the system to change the arming state of the device does not result in that knowledge automatically being provided to the device. Rather, the device is responsive to every security threat detection, by sending a security threat detection signal to the server, and then waiting for any reply thereto to determine if it needs to perform a verification or deterrent action in response to the threat. In this approach, the device need not expend energy regularly communicating with the server to maintain knowledge of its current arming state.

In certain embodiments, the security response device may, in response to transmitting a signal to the server, receive an arming state communication comprising information defining its arming state. It may be useful for the device to become aware of its arming state, once it has detected a security threat, as this may enable the device to determine whether to perform a security response or make further configuration steps such as to ready itself for making a further security threat response. For instance, if the device comprises a smoke emitter configured to release a charge of a security smoke, it may be convenient to put the smoke emitter in a ready state. The armed state communication may explicitly define the arming state, but in other embodiments it may imply it. For example, by providing a command to perform an action that can only be performed in the armed state the server may imply that the security response device is meant to be armed.

In the armed state, a security response device may be responsive to a threat in a variety of ways. It can, for instance, detect a threat and then send a threat detection signal to a remote location, such as a monitoring station or a portable user device. At that remote location, suitable response action can be taken, such as opening up a voice communications channel with the installation site, operating monitoring cameras at the installation site to determine the nature of the threat, activating alarms, or contacting emergency response services.

These responses can be the result of human intervention or can be automatic. That is, a user at a monitoring station or a portable user device may cause input at an input device causing selection and initiation of a response action. Alternatively, an automatic process may be established at a monitoring station or a portable user device, on the basis of which a response action is initiated. The automatic process may be pre-installed, or may be configured by a user. The automatic process may be rules-based.

In certain embodiments, detection of a threat causes local threat response action, even without intervention from a remote location. In the conventional approach, a locally installed control hub, on receipt of a threat detection signal, will issue an alarm signal which can then be used to initiate one or more of a plurality of responses, including an audible siren, light emissions including disorientating light emissions, security smoke emissions or visible alarms.

This is predicated on the existence of a locally installed control hub, and the fact that the control hub will normally store an indication of the system's "armed" or "unarmed" state. In embodiments disclosed herein, it will be seen that the need for a control hub can be obviated. This can be achieved even in the event that the locally installed security response device is itself not aware of its "armed"/"unarmed" state. That is, it is not essential for the locally installed security response device to retain its state in that respect— the system with which the security response device is in communication will retain this state record and can respond accordingly.

It should be noted that while embodiments are described that do not include a control hub local to the secured premises, the present disclosure does not preclude provision of a control hub.

As illustrated specifically in FIG. 1, a security system 10 comprises a security device 100, installed in a premises, capable of establishing a cellular connection with a cellular network as represented by a cellular network base station 50. The cellular network establishes a connection with a wide area network 30, generally a wired or predominantly wired network, for example an interconnected network of networks such as the internet.

The reader will appreciate that network conditions may change over time, and the particular cellular network base station that a device connects to may change.

The security device 100, as will be described in further detail in due course, has a capability to monitor a scene for a security threat. The security threat could comprise an unauthorised person in a secured location, a vibration or other kinetic impulse commensurate with an attempt to gain entry to a secured location, or a sound indicative of an unauthorised intrusion. The detector may be a detector of electromagnetic radiation, an audio detector, magnetic detector for a door/window, or any other detector suitable for detecting a threat.

The detector may be passive or active. A passive device generally detects incident energy imparted thereon from ambient conditions; an active device effects an emission and then determines a response to reflections of that emission back on the device. Such a detector may be used to detect motion.

In an example, the detector is an electromagnetic detector; in one example it is an infrared detector, which is preferably a passive infra-red detector.

If the detector is an active detector, it may be a doppler detector based on radio waves light or sound waves, and/or it may comprise a ranging function. Examples of devices with ranging facilities include Radar, Lidar and Sonar, which tend to include doppler functionality as well.

Further in FIG. 1, a monitoring station 200 also has connection to the network 30, and is thus capable of communication with the security device 100. As illustrated, the monitoring station 200 is in the same cell of the cellular network and thus connects to the same base station 50 as the security device 100, but this need not be the case.

The monitoring station 200 can be implemented as an application specific device, or can be implemented on a general purpose computer with capability to connect to the network 30, for instance by a fibre-implemented network and via components of the Internet.

As noted above, the security device 100 is configured such that it can be placed in a power saving mode, in which it disables cellular communication. It exits the power saving mode and activates its cellular communication capability on detection of a security threat, the cellular communication capability being initiated upon transmitting a signal to the network 30, e.g. to a server 400, and maintained for a time to listen for any messages, such as a response from the server 400. The server 400 is provided to interface between (a) the security device 100 and (b) the monitoring station 200 and/or a user device 300, for example by relaying information between them. The server 400 is configured with functions to enable responsiveness to the arming state of the security device 100 and to various responses to actions initiated by the security device 100 and, as the case may be, the monitoring station 200 and the user device 300.

Thus, when the security device 100 is not in the power saving mode, a remote device (e.g. the server 400) can communicate with the security device 100. The server 400 can thus receive a security threat signal from the security device 100, and can then initiate in the security device 100 an appropriate response, optionally as commanded by the monitoring station 200 or user device 300. Thus the monitoring station 200 and/or user device 300 may be referred to herein as an operator node.

On the other hand, when the security device 100 is in the power saving mode, the server 400 cannot communicate with the security device 100.

In one embodiment, the monitoring station 200 provides a human operator interface. This can allow a number of different human monitoring facilities, which may be at a specific site and/or may be distributed. So, for example, on receipt of a security threat signal, the monitoring station 200 may trigger a human operator to make response decisions as to how the security device 100 should respond. Based on a response decision made by the human operator, and communicated to the monitoring station 200 using human input action, the monitoring station 200 can send a security threat response signal back to the server 400, which sends a corresponding security threat response signal back to the security device 100. While the server monitoring station 200 is in the described embodiments remote from the server 400, in other embodiments the functions of the server 400 may be provided by hardware of the monitoring station 200.

The security device 100 can then be responsive to receipt of a security threat response signal to make a security response action. Such an action can be, as mentioned above, audible, visible, or any other response such as could be envisaged by the reader. For instance, a deterrent could be emitted, such as comprising: light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent.

The response at the server 400 may be dependent on an arming state of the security device 100. Generally, as will be familiar to a reader, a security system applied to a location to be secured, can be "armed", or "unarmed". In an armed state, the system is configured so that detected threats result in a security response, whereas in an unarmed state, a detected threat leads to no security response. Where multiple devices are included in the security system, there may be hybrid states between these two. For instance, in a multi-zone installation, different zones may be armed while other zones remain unarmed. This is useful for example if, in a residential dwelling, it is intended to allow occupants to retire to sleeping quarters while securing other parts of the dwelling. The singular device 100, however, may more specifically be intended to be in either an armed or disarmed state.

For the purposes of this disclosure, the arming state of the installation, of which the security device 100 is a part, may be unknown to the security device 100 itself. That is, the security device 100 does not possess a record as to whether it is armed or unarmed. In fact, the security device 100 is not required to have processing capability sufficient to store a record of its arming state. The security device 100 will thus respond to any detected security threat by sending a threat detection signal, regardless of whether the system is armed or not. The armed/unarmed state is recorded at the server 400, which thus discriminates its response to a threat detection signal based on the armed/unarmed state.

It may be, for instance, that, in the unarmed state, the server 400 makes no response at all to receipt of a security threat detection. It could make a record of receipt, or it could discard the signal completely. It may not thus trigger any form of response from a human operator at the monitoring station 200.

In the armed stated, by contrast, the server 400 makes a response, which could be based on human operator action at monitoring station 200, or could be automatic—so, for instance, in certain systems, a receipt of a threat detection signal may automatically trigger a threat response signal being sent back to the security device 100.

Configuration of the armed/unarmed state, and other operational parameters, may be made by human input action at an application (an "app") hosted on the user device 300. The user device 300 also has cellular connection capability. As noted in FIG. 1, the user device 300 can connect to another cellular base station 52 to enable establishment of a connection to the network 30 and to the other components as illustrated. So, a user can operate a user device 300 to put the security system into the armed state, regardless of the user's physical location.

The user device 300 may provide an interface to a human operator in addition to or instead of the provision of such an interface by monitoring station 200. Accordingly, the user device 200 may enable a human operator to perform at least the same responses that they may perform at the monitoring station 200 and vice versa. For example, the threat signal can be sent via the server 400 to the user device 300 and/or to the monitoring station 200. A person operating the user device 300 and/or the monitoring station 200 may issue a command, via the server 400, to the security device 100, to output one or more deterrents, or, for instance, to obtain further information about the threat through the capture of video or audio footage by the security device 100. However, the user device 300 is intended for use by an owner or resident of the premises at which the security device 100 is installed, whereas the monitoring station is intended to be staffed by professional operators dedicated to the task of monitoring multiple premises.

The user device 300 may comprise an application specific device, or may be a general purpose device, typically a smartphone, but optionally a tablet or a laptop or the like.

Figure 2:
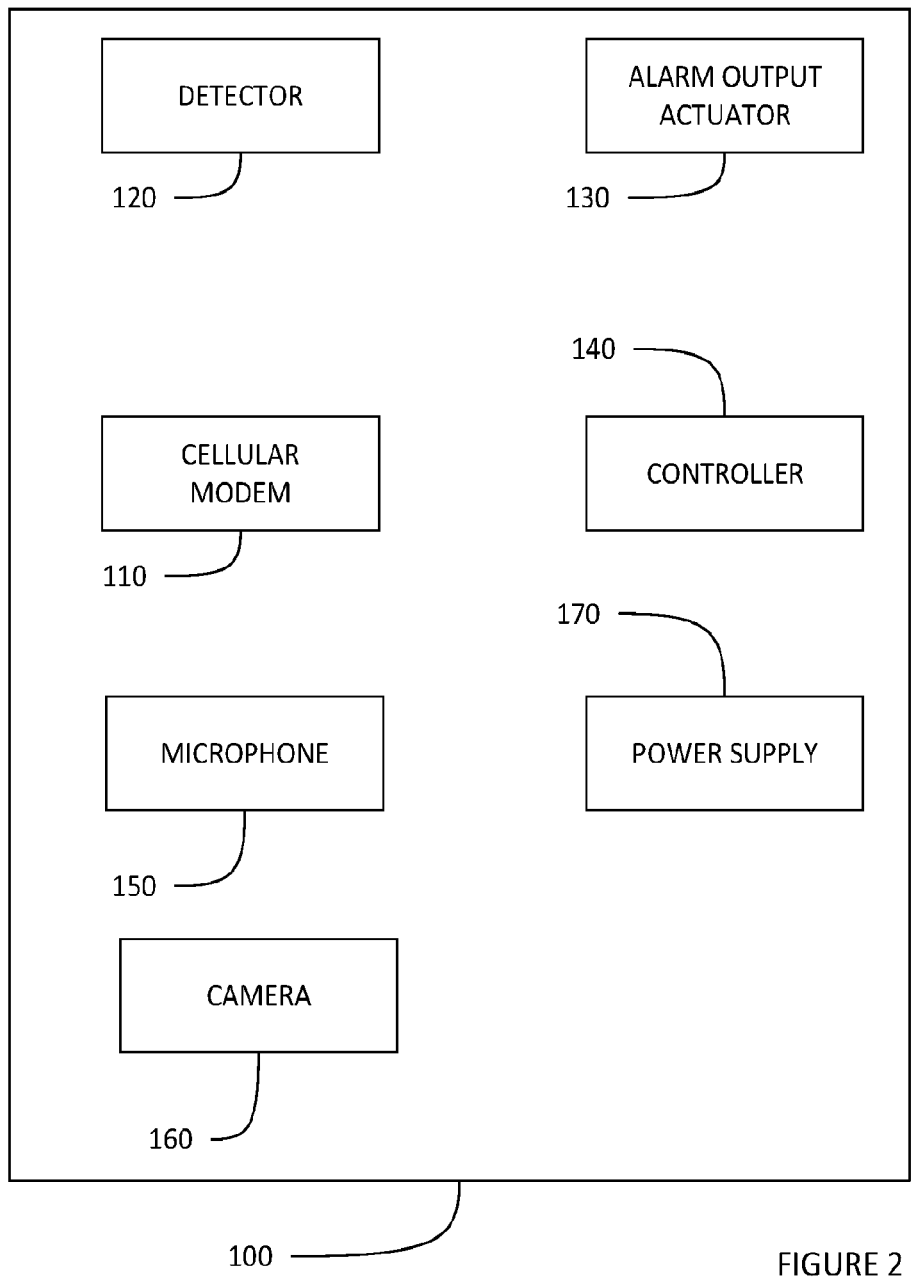
FIG. 2 illustrates a security device of the security network of FIG. 1.

FIG. 2 shows a more detailed view of the security device 100. As mentioned previously in this disclosure, the security device 100 comprises a cellular modem 110 capable of establishing two-way communication, according to an established telecommunications protocol, with a cellular base station, such as the cellular base station 50 as shown in FIG. 1. The cellular modem 110 may for example be provided by integrated electronics, e.g. a dedicated chip, or a module of a processing chip (e.g. a software and/or hardware module, of a CPU of the security device 100), or by a plug-in modem, e.g. a USB modem or the like. The present disclosure is not concerned with any particular telecommunications protocol, but features of LTE will be discussed in due course. Additionally the device 100 may comprise a speaker (not shown) and an audio controller (not shown).

A detector 120 provides a facility to detect a security threat. As mentioned above, the detector 120 can be of a variety of different possible technologies. For the benefit of this specific example, the detector 120 is a passive infrared (PIR) sensor.

An alarm output actuator 130 is operable, on receipt of a control signal, to cause emission of an alarm output. For the purpose of this example, the alarm output comprises a sound emission from an alarm sounder of the alarm output actuator 130. However, as the reader will appreciate, the alarm output can include emission of any one or more of a light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent. The alarm output actuator 130 supplied in a particular embodiment will reflect the specific requirements of the implementation. The alarm output actuator 130 may alternatively be termed a deterrent actuator.

A controller 140 controls operation of the security device 100, according to a procedure that will be described in due course. A microphone 150 and a camera 160 are provided, to offer facilities to gather information as to the nature of a detected threat and to record activity observable at the device 100.

The structure and form of the controller 140 will be implementation specific. In an embodiment, it comprises a central processing unit (CPU) of substantially standard form, and is capable of executing instructions, such as provided in machine code language, to enable performance of its controlling functions. For example, the CPU may comprise one or more microprocessors and/or microcontrollers. Other possible implementations will be recognised by the reader, such as the configuration of an application specific integrated circuit (ASIC) or a field programmable gate array (FPGA), depending on design choices.

A power supply 170 provides power to other components of the device 100. The controller 140 is able to control distribution of power to other components, especially to the cellular modem 110 but also potentially to other high power consumption components such as the microphone 150 and camera 160.

All or some of the above features of the security device 100 may be provided as discrete components or integrated together, depending on the implementation.

The security device 100 can be considered as a security response device as it is capable of a security response action. The reader will appreciate that the security device 100 may have further functions.

In this embodiment, the security response device 100 is battery powered only, and installed in an installation site as part of a security system at the installation site. However, the present disclosure does not preclude the provision of a mains power supply to embodiments of the security device 100.

Embodiments of the security device 100 enable cellular connection to the server 300 such that it is capable of managing power consumption of such a cellular connection, send a threat alert message, and listen for a threat response message such that it can receive a human-initiated command via the cellular network. It is an aim that this can be done with minimal power consumption without suffering a detrimentally long latency.

Figure 3:
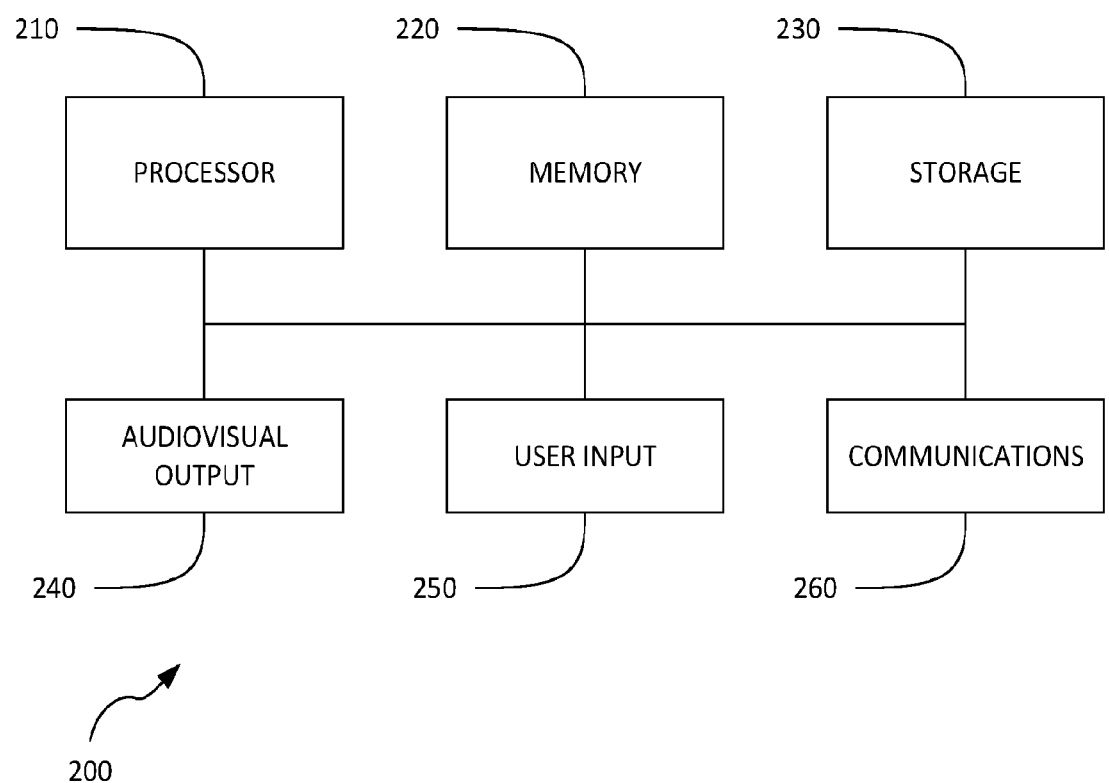
FIG. 3 illustrates a monitoring station of the security network of FIG. 1.

Turning to FIG. 3, the monitoring station 200 may comprise a general purpose computer in conventional form, including a processor 210, a memory 220 for short term retention of processing data, and storage 230 for long term (but potentially slow retrieval) storage of program, processing and informational data. In conventional implementations, the processor 210 may comprise a general purpose microprocessor, capable of executing instructions to obtain desired processing functions. The microprocessor may, in certain implementations, be augmented by more application-specific processing capabilities, such as a graphics processing unit (CPU), a System-on-Chip (SoC) suitable for use in establishing communications, or other functions which will be apparent to the reader. The memory 220 may comprise Read Only Memory (ROM) and Random Access Memory (RAM), as required for the provision of memory storage facilities to the processor 210.

The storage 230 may comprise a magnetic drive, or a solid-state storage device. An audio-visual output facility 240 is provided, such as a visual display unit and speakers, for display and audio output to a user, and a user input device 250, such as a keyboard, pointing device (e.g. mouse) and microphone are provided to enable user input action to the monitoring station 200. A communications facility 260 provides connection to the network 30, for instance through internet connection or a direct LTE protocol connection. Optionally the monitoring station 200 may comprise a plurality of such computers, two or more of which may share at least some hardware resources.

For example, a plurality of user input devices and audio/visual outputs may be provided to at a respective plurality of terminals, each attended by an operator.

Any of the above features of the monitoring station 200 may be provided as discrete devices or integrated together. For instance, a laptop or tablet form computer may have more integration of components than a desktop form computer, simply to enable composition of the computer into a constrained form. A desktop form computer offers certain advantages in terms of being able to swap out particular components, such as to upgrade memory facilities, when the need arises.

Figure 4:
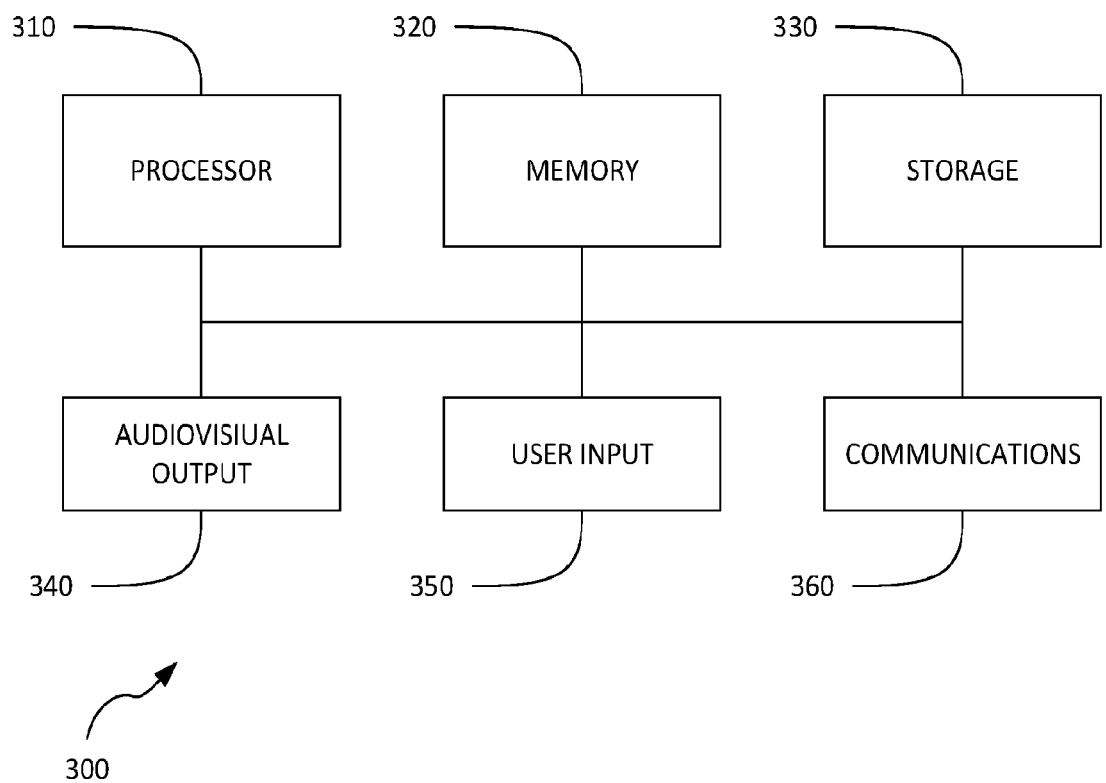
FIG. 4 illustrates a user device of the security network of FIG. 1.

As shown in FIG. 4, the user device 300 comprises a smartphone which itself includes a processor 310, a memory device 320, a storage device 330, audio-visual output 340 in the form of a screen and a speaker, user input 350 in the form of a touchscreen and microphone, and a communications unit 360 in the form of an LTE modem and antenna. As will be appreciated, the various components may be integrated if this is the most effective way of achieving a practical device within constraints of form.

Figure 5:
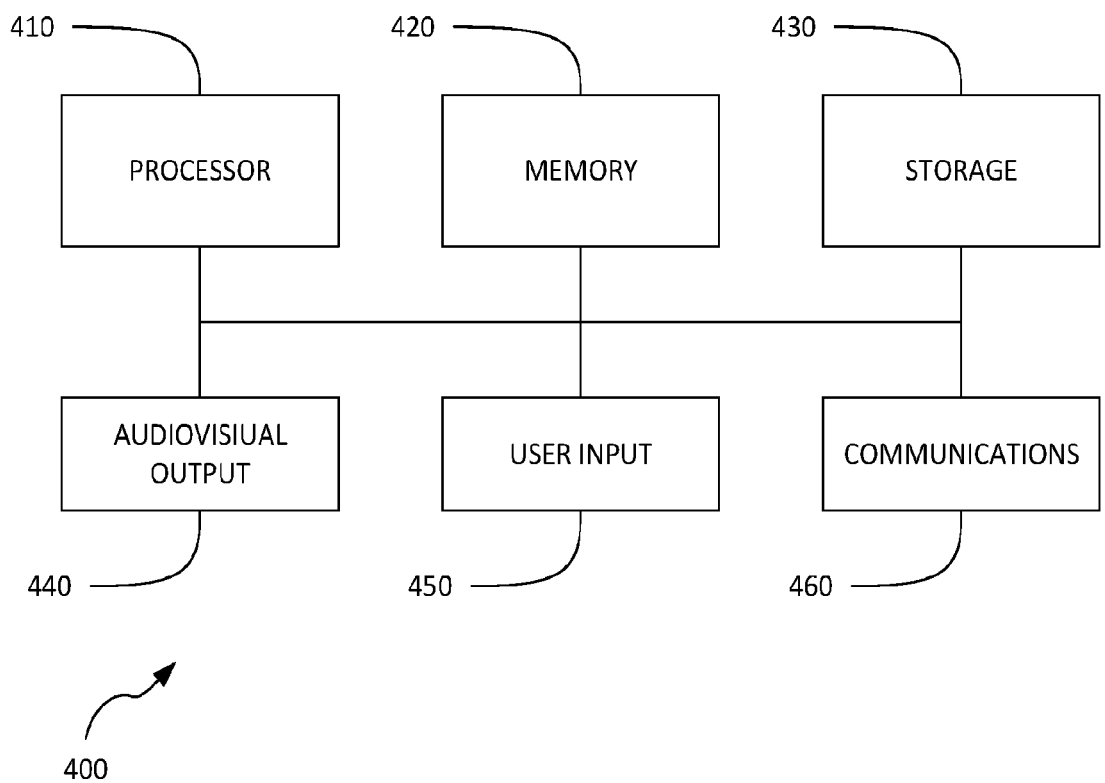
FIG. 5 illustrates a server of the security network of FIG. 1.

The server 400, as shown in FIG. 5, comprises a computing device which includes a processor 410, a memory device 420, a storage device 430, and a communications unit 460 in the form of a modem for establishment of a connection with the network 30. Optionally the server may also comprise an audio-visual output 440 in the form of a screen, user input 450 in the form of a keyboard and pointing device. The server 400 provides an interface between the monitoring station 200 and the user device 300, and the security device 100.

Figure 6:
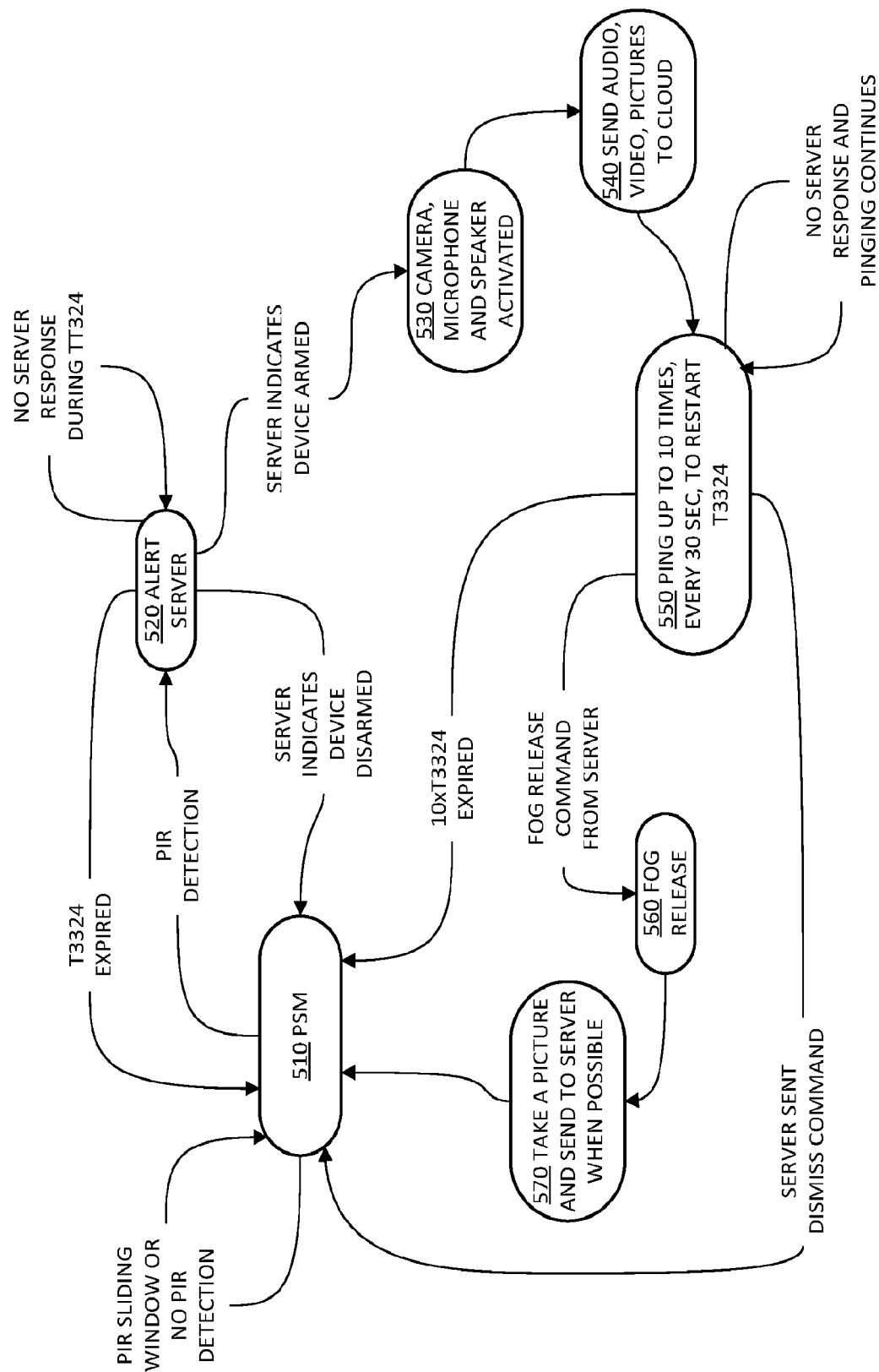
FIG. 6 illustrates a state transition diagram for operation of the security device of FIG. 2, in accordance with a first example configuration.

An exemplary operation of the security device 100, and more particularly the controller 140 of the security device, will become clear from the state transition diagram of FIG. 6.

In the process, the device is normally in a power saving mode, in which components of the device are disabled or powered down to conserve stored electrical energy. Most particularly, it can be advantageous in the power saving mode to keep the cellular modem 110 in a powered down mode, so that it cannot send or receive signals in the cellular network.

Even in the power saving mode, the device is registered to the network and the connection is maintained.

This approach, particularly in the context of an LTE implementation, has certain advantages, since, if it were necessary for a device, on exiting its power saving mode, to firstly register to a network and establish a session, this could expend a substantial period of time. This would add delay to the process, to be described below which, in the context of providing a security system, could have a deleterious impact on operation. So, although not necessarily so in all embodiments, the present disclosure presupposes that the device has already been registered to a network.

In the context of LTE, the registration process would normally involve exchange of configuration information, to enable conduct of cellular communication in conformance with a technical standard. In this exchange, it may be convenient to define certain parameters selectable by a registering LTE device. This could include, for instance, the selection of a duration for network enabled timers such as T3324 and T3412.

In certain implementations, the power saving mode may be contemplated as a "sleep" mode, for example a sleep mode or off condition of a processing chip of the device 100 may utilized. However, it should be noted that, even in this mode, certain parts of the functionality of the device 100 will remain active, notably the threat detection functionality.

Upon occurrence of a predefined condition (namely a sensed security threat), the device exits the power saving mode and the cellular modem 110 is then powered up and capable of communicating.

FIG. 6 illustrates the device 100 as being in the power saving mode in a state as identified 510. It is preferably that in state 510 the device remains connected to (e.g. registered with, etc) the cellular network. In this state, on the trigger of a sensed security threat (e.g. a PIR detection), the device 100 switches to an alert state in which the communications interface 110 is in discontinuous receive mode and a timer is started for remaining in the alert state. As indicated in FIG. 6, the state 520, labelled "Alert Server", corresponds to the sending of a communication from the device 100 to the server 400, so that the server 400 is aware of the PIR detection. The sending of the communication indicating the occurrence of the PIR detection starts the timer.

In the context of the 4G/LTE standardised protocols, the timer set at this stage for establishment of the alert state 520 can be the T3324 timer, and while this timer is running the device 100 is in Discontinuous Receive (i.e. DRX) Mode. Until this timer expires, the device 100 can be considered capable of receiving a signal from the server 400 via the 4G/LTE cellular network. At the expiry of the timer, the device 100 will return to the power saving mode of state 510, in which it will be "connected" to but not able to receive traffic from the cellular network. In other words, it is registered to the network but cannot be accessed by the cellular network. The device 100 will remain in the power saving mode (state 510) until the device 100 next sends a transmission.

In exemplary embodiments, it is considered to set T3324 as 30 s. Lower values, such as 20 s may be possible, and the 4G/LTE suite of standards generally provide for T3324 to be 16 s or more. The value of T3324 is set on registration of the device 100 with the cellular network.

Independent of timer T3324, another timer T3412 (extended tracking area update timer) operates, which determines the regularity of sending a "tracking area update", and is set to for example 2 hours. When sending the tracking area update, uses this wakeup opportunity to also send status and log information to the server and to enable software updates therefrom, in response. The tracking area update and these communications to the server is the only reason why the device 100 needs to wake other than in response to a sensed security threat.

If necessary, the values set for Timer T3412 and T3324 can be requested/changed from the network during ATTACH REQUEST (when connecting to the network) or a TRACKING AREA UPDATE REQUEST.

So, as indicated, the controller 140 is maintained in state 520 while no response has been received from the cloud to the security threat signal. There are three possible ways in which the controller transitions from state 520.

Figure 7:
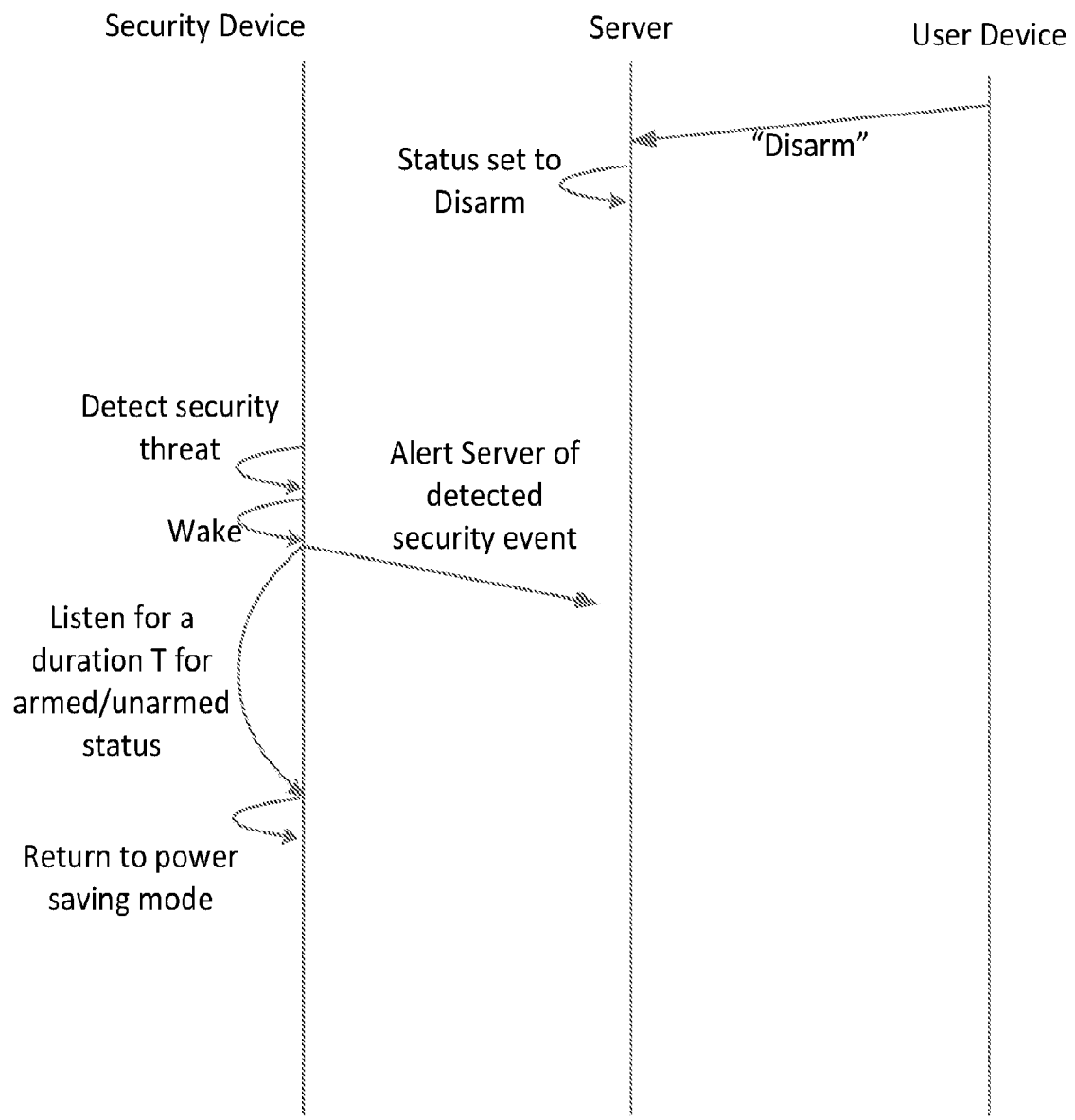
FIG. 7 illustrates a swim-lane diagram for operation of the security device in accordance with the configuration of FIG. 6, in a first case.

Firstly, timer T3324 can expire, without receipt of a signal at the device 100. This scenario is illustrated in FIG. 7. As shown in FIG. 7, a communication takes place between user device 300 and the server 400, in which the user device 300 indicates that the security device 100 should be considered to be in the "disarmed" state. The disarmed state could be because the user is in the premises, because another person is authorised to be in the premises, or for a variety of reasons such that the user does not want the security system to be activated. So, when the device 100 makes a PIR detection, the server 400 makes no response. The device 100 wakes, and via the cellular network, informs the server 400 of the security event. This causes commencement of T3324 so that the device is then able to receive a response from the server 400 by operating in a discontinuous receive mode. Due to the server's knowledge of the arming state of the device 100 as being "disarmed", no such response is received. On expiry of T3324, the device 100 returns to state 510 in which it is in the power saving mode, and is thus unresponsive to any signals transmitted to it, for example it would not be able to receive such a signal were such a signal sent transmitted to it.

Secondly, a response can be received from the server 400, that the security device is disarmed. In this case, the controller 140 similarly reverts to state 510 upon expiry of T3324, because no security response is required from the security threat detection.

In either case, the device 100 reverts to state 510, in connection with the cellular network, there may be a further initiation of the PIR (subject to a sliding window timer to avoid redundant positives), in which case a further transition back to state 520 can be initiated.

Figure 8:
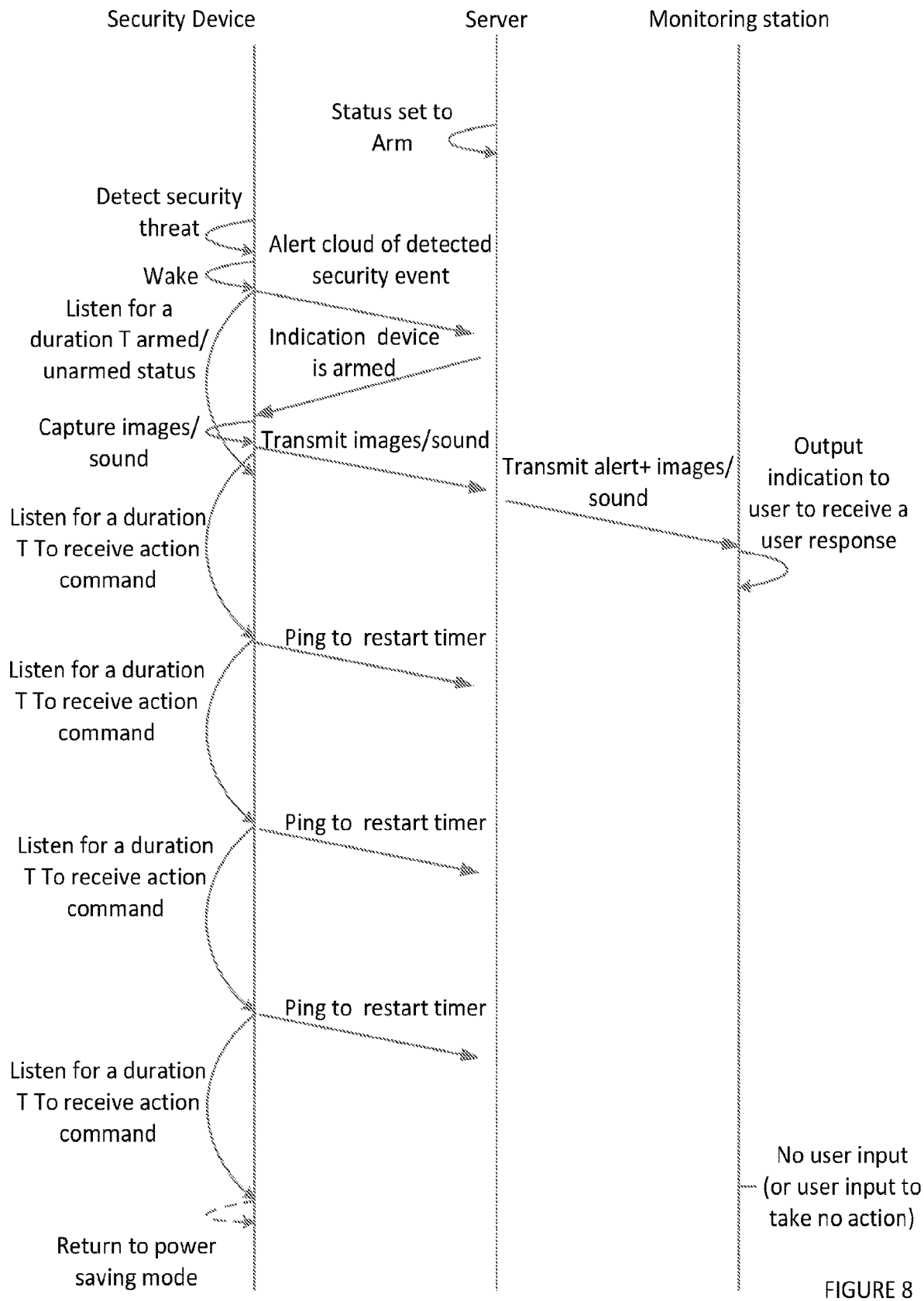
FIG. 8 illustrates a swim-lane diagram for operation of the security device in accordance with the configuration of FIG. 6, in a second case.

Thirdly, a response can be received from the server 400 during the pendency of the T3324 timer that the security device 100 is armed. In this case, the controller 140 transitions to state 530, in which case the camera 160, microphone 150 and, potentially a speaker of the device 100 are activated. This scenario is illustrated in FIG. 8.

Once these components are activated, the controller transitions to state 540 in which audio or video captures from the microphone 150 and camera 160 are sent to the server 400 and then on to the monitoring station 200 or user device 300 as the case may be. At this point, the monitoring station 200, as in the illustrated example, or alternatively the user device 300, waits for a user response.

Then, once these captures are sent, the controller 140 transitions to state 550 in which a ping (an alert) is sent to the cellular network, causing T3324 to be restarted. In an embodiment, this restart occurs up to a maximum number of times, which may for example be between 4 and 15. The maximum number of times is indicated as 10 times, as a specific example, in FIG. 6 but, as shown in FIG. 8 for reasons of clarity, the maximum number can be 4. As shown, no response is received from the server to the sending of the audio or video captures, because no user input action has been received at the monitoring station 200. The restarting of the timer a predetermined number of times is to provide a maximum threat verification period selected to be of sufficient time for a person at the monitoring station 200 to decide whether and/or how to respond via a user input action. In example embodiments the person may be provided with a maximum threat verification period having a value that is preferably in the range of 120 to 720 seconds. In some embodiments the value is more narrowly in the range of 240 to 560 seconds. As an example, the value may be assumed to be 300 seconds, so in embodiments in which T3324 restarts 10 times, T3324 is set to 30 seconds, while in the case of T3324 restarting 4 times, it is set to 75 seconds.

If, after the maximum number of restarts of T3324, there is no response from the server 400, then the controller 140 reverts to state 510.

The process as illustrated in FIG. 8 also offers the possibility of providing a facility for a user at the monitoring station 200 to make an active decision to take no action, and to make a user input action accordingly.

The reason for using iterations of T3324 (ten in this case, but it may be more or fewer) rather than another timer, is that 4G/LTE provides only this timer for supporting discontinuous receive mode. This means the value selected for T3324 is important because it involves a trade-off between multiple variables in order to minimise power consumption, as will now be explained.

In order for the security device 100 to restart T3324, the security device 100 must make a transmission to the cellular network. Such transmissions consume a relatively large amount of energy. Therefore, on one hand it is advantageous to minimise the total number of transmissions needed to reach the desired maximum threat verification period. However, using fewer transmissions would require T3324 to be greater— as mentioned above, in the cases exemplified above, using four T3324 restarts would require T3324 to be set to 75 seconds, whereas using ten T3324 re-transmissions would require T3324 to be set to 30 seconds. The device 100 must operate in a communications mode, albeit a discontinuous one, for the entirety of the period defined by T3324, i.e. 75 or 30 seconds in these examples, and operating such a mode consumes more power than when in the power saving mode. Thus, having T3324 set to higher value wastes power if the security device 100 turns out to have been set to a disarmed state, because learning the arming state from the server 400 is relatively quick, e.g. within 1 second, which is only a small fraction of the time in which provided device 100 must stay in the communications mode listening for the arming state. By the same rationale, if T3324 is set to a small value so as to waste minimal energy listening for arming states that could turn out to be disarmed, then more pings and (therefore more energy consumption) are needed from the device 100 to provide the desired maximum threat verification period.

The precise values set for T3324 and the total pendency window (and therefore by implication the number of pings) may be application specific and may be determined empirically or by calculation, based on the considerations described above.

In another example, T3324 is configured to a value between 16 and 60 seconds, e.g. 30 seconds; and the maximum threat verification period is controlled to be 500 seconds.

As will be appreciated from the examples about the value configured for T3324 is the same when the device is the power saving mode as during the threat verification period.

It is a safety benefit of the device 100 that, particularly where the device can output a strong deterrent, once the maximum threat verification period expires, the device 100 returns to a power saving mode in which is cannot receive a command to output the deterrent.

In some embodiments, if a facility is provided for a user to make an active decision to take no action in response to an indication of a security threat, for instance at the monitoring station 200, the monitoring station 200 could send, via the server 400, a dismiss command to the security device. This could occur, for instance, if a user at the user device 300 sees the video capture but perceives no risk (for instance, the PIR has been triggered by a household pet). In this case, the dismiss command would cause the controller 140 to revert to the state 510, optionally without the device 100 causing any further T3324 restarts. If this occurs before the maximum number of permitted T3324 restarts, then threat verification period will be less the maximum threat verification period.

The facility to prompt a user to make an active decision may, in some embodiments, be governed by a timer synchronised with the amount of time remaining at the security device before exhaustion of iterations of the T3324 timer. The amount of time will be known at the server by virtue of receiving each ping that had restarted the timer. The amount of time remaining can then serve a timer to the user device. This enables display of a countdown indicating to the user an amount of time remaining before a decision can no longer be made and input to the user device. The countdown display may display a time which may include a reduction to compensate for user reaction time and system latency, to encourage a user to make an early decision, so that the user's decision can be conveyed to the security device in due time.

In an alternative embodiment, a countdown display need not be provided to the user—it may, for example, simply be sufficient to make an indication (audible or visual) to the user that the time for input has expired.

Figure 9:
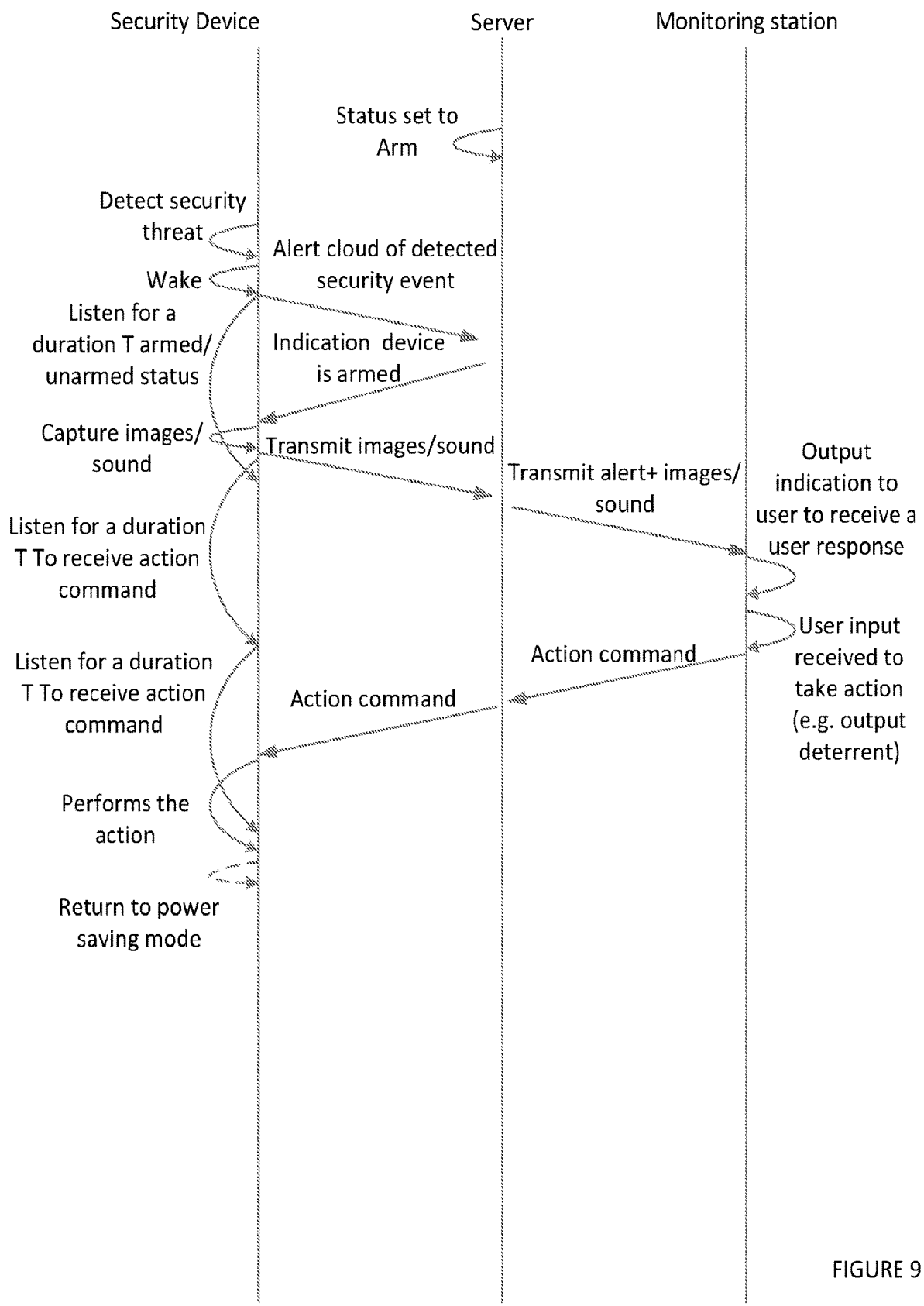
FIG. 9 illustrates a swim-lane diagram for operation of the security device in accordance with the configuration of FIG. 6, in a third case.

In some scenarios, following user input action at the monitoring station or at the user device 300, a threat response command may be sent from the server 400 to the security device 100. This scenario is illustrated in FIG. 9. As shown, a response is received by the security device 100 that the device is armed, in the first T3324 time period. This then triggers the device, in state 530, to capture images or sound of the monitored scene. These images and/or sound are sent to the server 400 on the cellular connection in state 540. This transmission triggers commencement of another T3324 time period, and the device 100 sits in state 550, pinging up to ten times and restarting T3324 while it waits for a server response. In this scenario, the server 400 causes the initiation of a presentation, at the monitoring station, of a prompt to a user for a user response, and a user response is received for the security device 100 to perform a deterrent action. A corresponding action command is sent back to the security device 100 via the server 400. This action command, in this case, is a light-obscuring substance release command. The figures refer to the light-obscuring substance as being fog, but the light-obscuring substance may specifically be or comprise smoke.

Receipt of the light-obscuring substance release command causes the controller 140 to transition to state 560, which initiates release of a security light-obscuring substance by the alarm output actuator 130. Once the light-obscuring substance has been released, the controller 140 transitions to state 570, in which a further capture is made by the camera 160 of the observed scene, and sent to the user device 300 or the monitoring station 200 as the case may be, a person at the receiving device that the light-obscuring substance has been released. Once this has been completed, the controller reverts to state 510. As illustrated in FIG. 9, capture of an image of the scene after the emission of the light-obscuring substance is not essential to this embodiment and so the device can transition directly to state 510 instead.

By entering into state 510, the device 100 powers down; that is, all unnecessary components are moved into a power saving state. As the reader will appreciate, this can include the cellular modem 110, the microphone 150, the camera 160 and the alarm output actuator 130. However, the device may maintain its ability to monitor the environment for a security threat, e.g. by means of PIR motion detection, to thereby trigger the reawakening of the device upon detection of such an event. As will be understood from the description herein, since the security device is not aware of its arm status it must treat all detection events as a threat, at least until it subsequently learns of its arm status.

Figure 10:
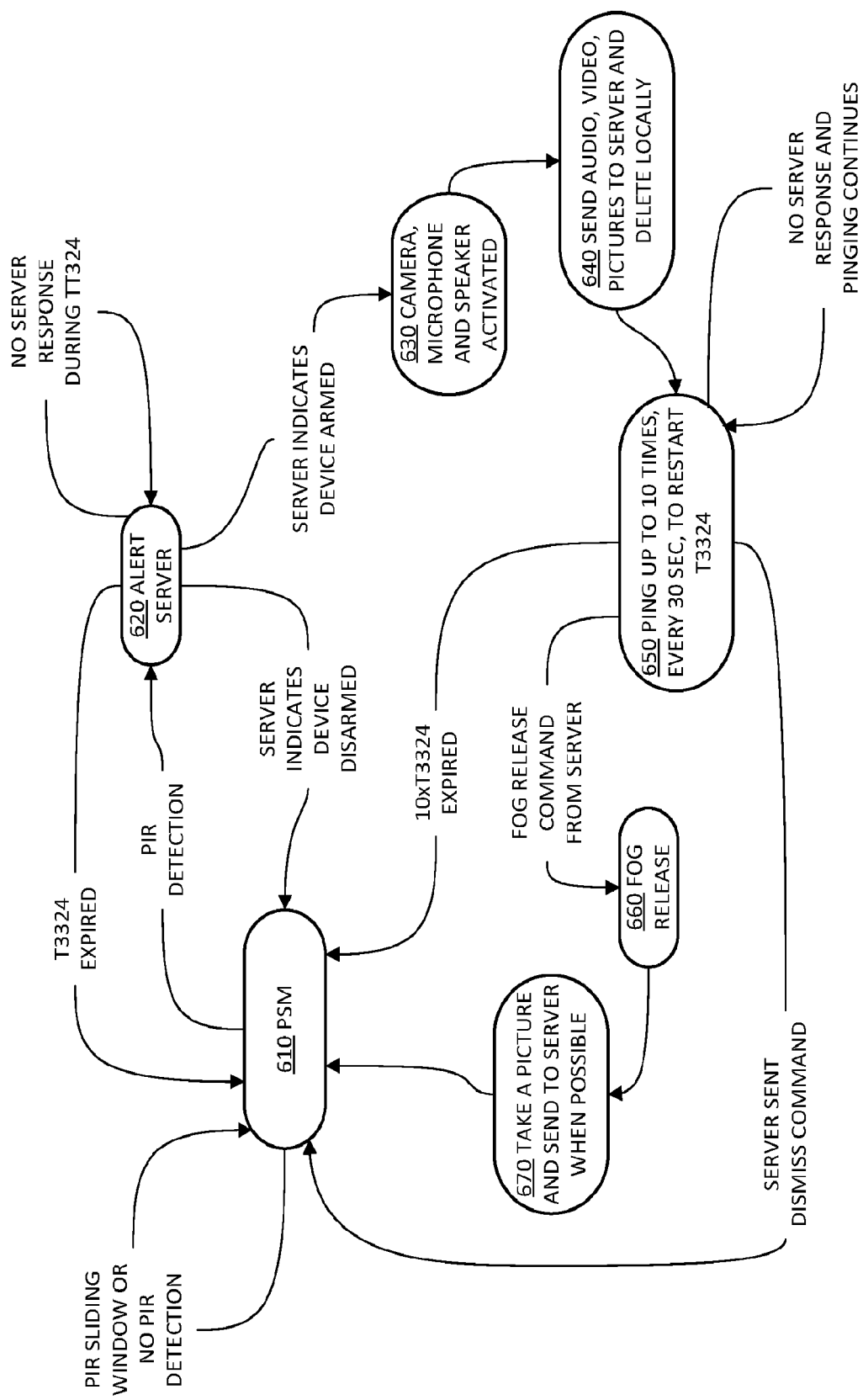
FIG. 10 illustrates a state transition diagram for operation of the security device of FIG. 2, in accordance with a second example configuration.

FIG. 10 shows a minor variant on the state transition model of FIG. 6. All states are labelled 610, 620, etc. corresponding to states 510, 520 etc. in FIG. 6. Thus, in the example of FIG. 6, it is similarly preferable that in state 610 the device remains connected to (e.g. registered with, etc) the cellular network. However, in the example of FIG. 6, in state 640, the process is clear to ensure that audio or video captures are deleted locally. This can also have a benefit of avoiding over-use of local storage.

In certain embodiments, the response to an alert signal could itself be a threat response. So, for instance, from the alert state 520, a threat response message might be received, which would cause the controller to transition directly to the threat response such as the light-obscuring substance release 560. It may not be necessary, in some embodiments, to provide for image or audio capture before issuing a threat response signal commanding a threat deterrent action (e.g for release and/or audible alarm etc).

In any case, the threat response may optionally comprise a threat verification action, which optionally may be the only security response action. For example, the threat response may be the capturing of one or more images at step 530, in response to the device 100 learning that the security system had been armed state. In some embodiments, a further security response action may optionally be subsequently enacted, such as at step 560.

In other embodiments only after a threat verification has been performed (e.g. step 530), can the device 100 enact a threat deterrent action or at least a threat deterrent action other than an audio and/visual deterrent (e.g. light-obscuring substance release), such as at step 560.

In some embodiments, a speaker is provided at the device, and a response state such as state 540 could involve opening an audio communication channel with an operator at the monitoring station 200 or a user of the user device 300. So, in that case, an intruder may encounter an audible verbal warning from a human operative monitoring the secured location.

Figure 11:
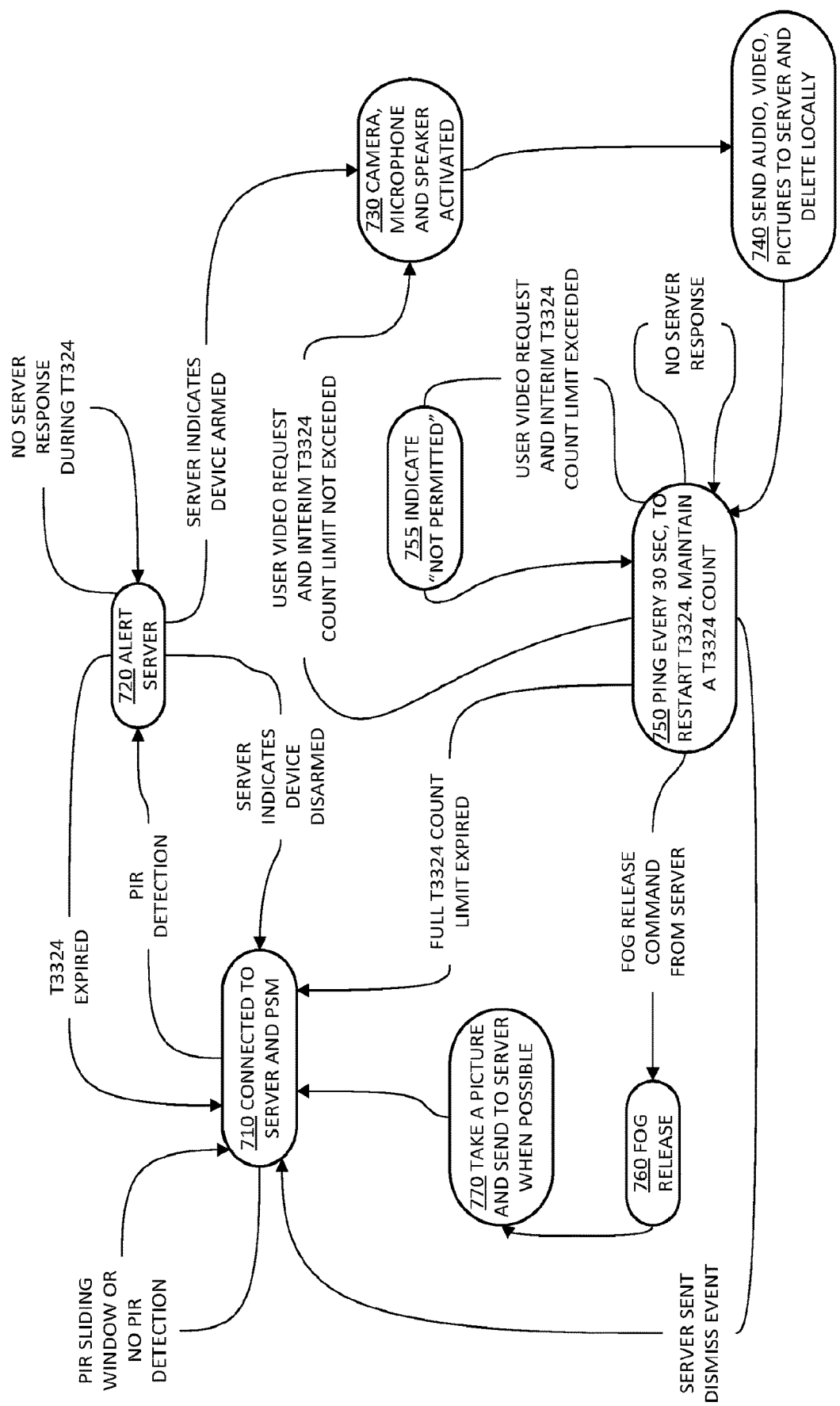
FIG. 11 illustrates a state transition diagram for operation of the security device of FIG. 2, in accordance with a third example configuration.

FIG. 11 illustrates a variant embodiment of the process at the controller 140, depicted as a state transition diagram. In this case, all states corresponding to states in FIG. 6 are replicated, with reference numerals commencing 710 etc.

Figure 12:
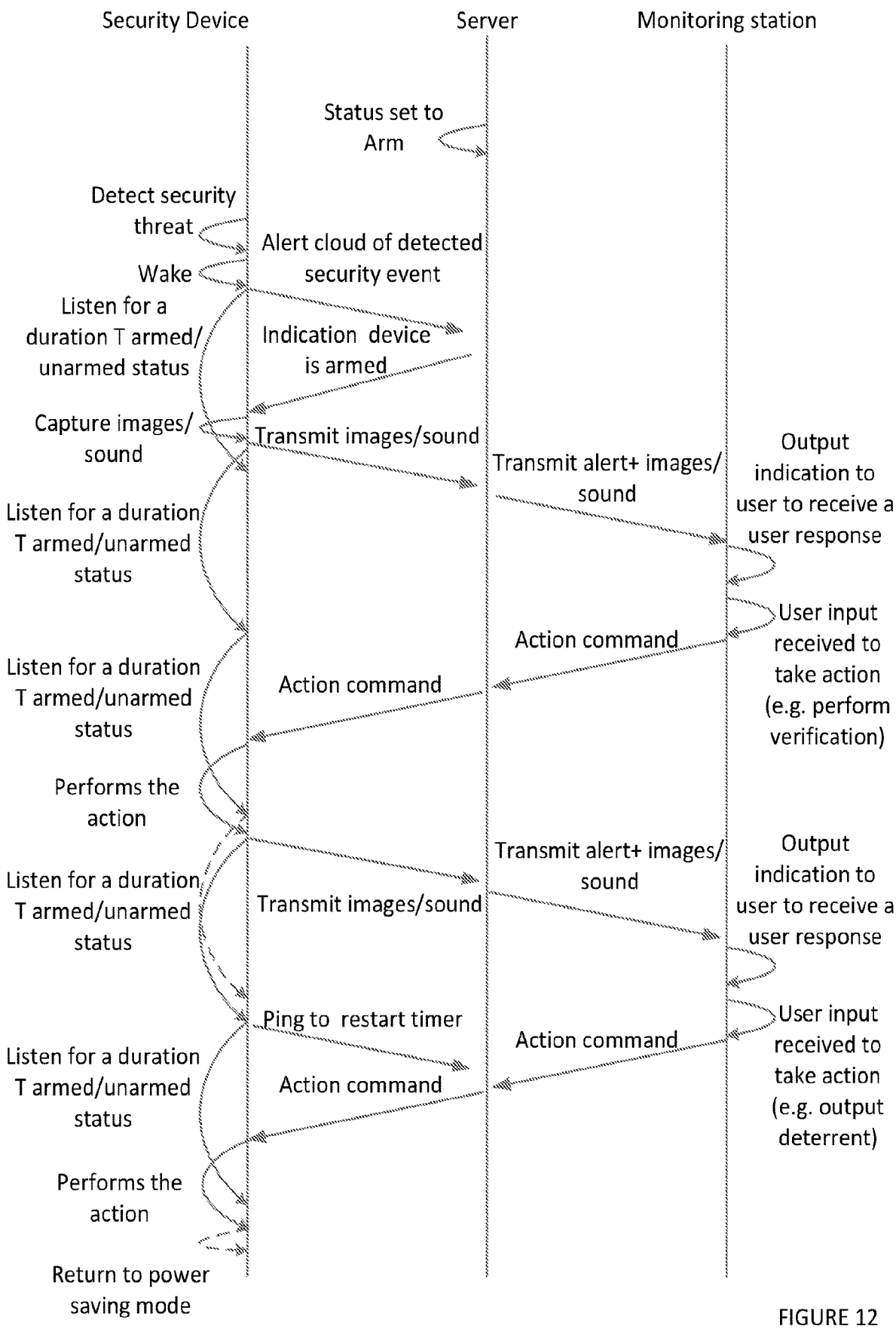
FIG. 12 illustrates a swim-lane diagram for operation of the security device in accordance with the configuration of FIG. 11.

In this case, there is an additional facility provided to a user. At the monitoring station 200, a facility is offered to a user to select to obtain further information about the security threat. So, the option exists for the user to select for capture of further images or sounds of the monitored site. As shown in FIG. 12, an action command of "perform verification" is sent from the monitoring station 200 via the server 400 to the device 100. As will be appreciated, in these and the other examples described herein a user device 300 may be instead of, or addition to, the monitoring station 200 to perform the role of the monitoring station 200.

So, when the device 100 is waiting in state 750 for an action command, for up to a maximum number of iterations of T3324, it may respond in two ways. Firstly, as before, if the device 100 receives an action command to release a threat deterrent (such as a light-obscuring substance), then the device proceeds, as before, to state 760 and so on.

In the examples described herein in which light-obscuring substance is released, the device 100 be instead be equipped to release a different light-obscuring substance. In some embodiments, the light-obscuring substance is smoke. The releasing of such light obscuring substance may involve producing the light obscuring substance. For example, in the case of smoke, the release of the light-obscuring substance may comprise generating the smoke by an exothermic reaction.

However, alternatively, if the device 100 receives a "perform verification" command, it then performs a further check. It determines if the number of iterations of T3324 so far has exceeded an interim limit. In this example, the interim limit can be set as 7 iterations, while the total number of iterations before transitioning back to state 710 is, for example, 10 iterations. The purpose of this interim limit is to determine if the requested verification phase can be performed before the device 100 should return to its power saving mode.

So, if the interim limit has been exceeded, it is determined in state 755 that the "perform verification" command is not permitted and cannot be performed. The device 100 reverts to state 750, in case it receives an action command to release a threat deterrent before the full count limit for T3324 iterations has been reached and thus the device reverts to state 710.

On the other hand if, as shown in FIG. 12, the number of iterations of T3324 has not reached the interim limit, the device can then transition back to state 730 and go through another round of image/sound capture and awaiting further action commands from the monitoring station.

In yet another embodiment, there is no interim limit and if the device receives a "perform verification" command, it performs the verification as commanded and resets the count of T3324 iterations to effectively thereby extend the total number of permitted pings, in this example by a further 10 pings, to remain longer in state 750 in awaiting receipt of a further action command.

All of the above examples have been described in the context of a battery powered security device 100. In that case, it is clear that the benefit of limiting use of the cellular modem is that it manages power consumption. However, certain benefits can still arise even if the security device 100 is equipped with an external power supply, such as mains power. In that case, it may still be advantageous to avoid an "always on" cellular connection. For instance, a provider of a cellular service may impose increased charges for a persistent connection, and it may be desirable therefore to limit access to the network. Further, it may be desirable to avoid a persistent connection, which could be vulnerable to attacks such as a man-in-the-middle attack.

However, it may be possible to make a distinction between the behaviour of the controller when connected to an external power supply and when reliant on a local battery supply. So, for instance, the number of iterations of T3324, at either the described full count limit or the interim count limit, may be dependent on the power supply condition. So, for example, without power supply constraint, the device 100 may be permitted to iterate T3324 more times, so as to listen for an action command, than if it is subject to battery power supply constraint.

Where reference is made in this disclosure of an emitted deterrent, such an emitted deterrent can, in general terms, comprise light, audio, tear gas, visible-light obscuring matter, fluid, paralyzing substance, pepper spray, sneeze inducing spray, a high output sound pressure, an electrically conductive projectile, a stink bomb, intermittent light, a physical deterrent, a physiologically affecting deterrent, or a psychologically affecting deterrent.

As used herein, except where the context requires otherwise, the terms "comprises", "includes", "has", and grammatical variants of these terms, are not intended to be exhaustive. They are intended to allow for the possibility of further additives, components, integers or steps.

The terms "power saving mode" and "discontinuous receive mode" may optionally be understood as having the same meaning as ascribed to such terms in reference to LTE.

The embodiments described above are intended to be indicative, and are not limiting on the scope of protection sought, which should be determined on the basis of the claims appended hereto.

Any embodiments herein in relation to a device or system is also applicable to a method and to a computer program product, which may take the form of a processor executable non-transient memory for storing instructions which when executed by the processor cause the performance of the method. Alternative implementations of a computer program product are contemplated as part of the present disclosure, including that such a product may be delivered by way of a downloaded signal from a server, and may be in the form of an update or cooperative product to one or more computer program products already installed in the device.

What is claimed is:

1. A security response device comprising:
   a cellular modem for establishing a communications channel between the device and a base station of a cellular network; and
   a security threat sensor for detecting a security threat;
   wherein the device is operable in a power saving mode in which the device is incapable of receiving a cellular communications signal via the cellular modem, or a communication mode in which the device is capable of receiving, via the cellular modem, a cellular communications signal;
   wherein in response to a security threat detected by the security threat sensor the device is operable to enter the communications mode and to emit, using the cellular modem, a security threat signal comprising an indication of the security threat detected by the security threat sensor; and
   wherein the device, in the communications mode, is operable to receive a security response action instruction in response to the security threat signal;
   wherein in response to receiving a security response action instruction the device is operable to perform a security response action corresponding to the security response action instruction;
   wherein the device is operable, in the communications mode, to remain in the communications mode for a security response action instruction period defined by a security response action instruction period timer; and
   wherein in the communications mode the device is configured to, in response to receiving a trigger, commence a threat verification period in which the device is ready to receive a verification response instruction, the trigger comprising any one or more of: an arming status signal indicating that an armed state is set for the device; and a threat verification action instruction to perform a threat verification action and to send a threat verification communication for remote verification.

2. A security response device in accordance with claim 1 wherein the device is operable, on expiry of the security response action instruction period without receipt of a security response action instruction, to transition to the power saving mode.

3. A security response device in accordance with claim 1 wherein the communications mode is a discontinuous communications mode, in which the cellular modem is operable to be intermittently capable of receiving a cellular communications signal.

4. A security response device in accordance with claim 1 wherein the security threat sensor comprises an electromagnetic radiation sensor operable to sense electromagnetic radiation incident on the sensor from an observed scene.

5. A security response device in accordance with claim 4 wherein the electromagnetic radiation sensor comprises an infrared sensor.

6. A security response device in accordance with claim 5 comprising a passive infrared sensor device, the passive infrared device comprising said electromagnetic radiation sensor.

7. A security response device in accordance with claim 1 wherein the security response action comprises a threat verification action.

8. A security response device in accordance with claim 7 wherein the threat verification action comprises a threat information gathering action to gather threat information describing the nature of a detected security threat.

9. A security response device in accordance with claim 8 and comprising an image capture device operable to capture an image of a scene, wherein the threat information gathering action comprises capturing one or more images of the scene.

10. A security response device in accordance with claim 1 wherein, on expiry of the threat verification period, the device ceases to be ready to receive a threat verification response instruction.

11. A security response device in accordance with claim 1 wherein the threat verification period has a duration that is controlled to have a maximum that is longer than the security response action instruction period.

12. A security response device in accordance with claim 11 wherein the threat verification period is an integer multiple of the security response action instruction period.

13. A security response device in accordance with claim 12 wherein the threat verification period is timed by restarting the security response action instruction period a predetermined number of times.

14. A security response device in accordance with claim 1 wherein the device is 4G/LTE compliant and the security response action instruction period comprises a period determined by a T3324 timer.

15. A security response device in accordance with claim 1 wherein the verification response instruction comprises information defining a threat deterrent action to be performed by the device.

16. A security response device in accordance with claim 1 wherein the verification response instruction is operable to cause the device to perform a threat deterrent action predefined at the device.

17. A security response device in accordance with claim 15 and comprising a chemical emitter operable to emit, as the threat deterrent action, a substance.

18. A security response device in accordance with claim 2 wherein the substance comprises a light-obscuring material and/or a smoke.

19. A method of managing power consumption at the security response device of claim 1, wherein the device comprises a cellular modem for establishing a communications channel between the device and a base station of a cellular network and a security threat sensor for detecting a security threat; the method comprising:

placing the device in one of a power saving mode in which the device is incapable of receiving a cellular communications signal via the cellular modem, or a communication mode in which the device is capable of receiving, via the cellular modem, a cellular communications signal;

wherein in response to a security threat detected by the security threat sensor the method comprises:
putting or maintaining the device in the communications mode;
causing the emission, using the cellular modem, of a security threat signal comprising an indication of the security threat detected by the security threat sensor; and
being ready to receive a security response action instruction in response to the security threat signal; and wherein in response to receiving a security response action instruction the method comprises performing a security response action corresponding to the security response action instruction;

wherein the device is operable, in the communications mode, to remain in the communications mode for a security response action instruction period defined by a security response action instruction period timer; and wherein in the communications mode the device is configured to, in response to receiving a trigger, commence a threat verification period in which the device is ready to receive a verification response instruction, the trigger comprising any one or more of: an arming status signal indicating that an armed state is set for the device; and a threat verification action instruction to perform a threat verification action and to send a threat verification communication for remote verification.

20. A non-transient memory comprising computer executable instructions which, when implemented on a security response device comprising a cellular modem for establishing a communications channel between the device and a base station of a cellular network and a security threat sensor for detecting a security threat, cause the security response device to become configured as a security response device in accordance with claim 1.

* * * * *

UNITED STATES PATENT AND TRADEMARK OFFICE
CERTIFICATE OF CORRECTION

| | | |
|---|---|---|
| PATENT NO. | : 12,277,852 B2 | Page 1 of 1 |
| APPLICATION NO. | : 18/563840 | |
| DATED | : April 15, 2025 | |
| INVENTOR(S) | : Mihael Bercovici et al. | |

It is certified that error appears in the above-identified patent and that said Letters Patent is hereby corrected as shown below:

In the Claims

Claim 18 in Column 17, Lines 31-33, which recites, "A security response device in accordance with claim 2 wherein the substance comprises a light-obscuring material and/or a smoke" and insert the following claim:
--A security response device in accordance with claim 17 wherein the substance comprises a light-obscuring material and/or a smoke.--

Signed and Sealed this
Nineteenth Day of August, 2025

Coke Morgan Stewart
*Acting Director of the United States Patent and Trademark Office*